US011812356B2

(12) United States Patent
Nagasawa

(10) Patent No.: US 11,812,356 B2
(45) Date of Patent: Nov. 7, 2023

(54) VEHICLE WITH AUTOMATIC REPORT FUNCTION

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 134 days.

(21) Appl. No.: 17/461,254

(22) Filed: Aug. 30, 2021

(65) Prior Publication Data

US 2022/0070645 A1    Mar. 3, 2022

(30) Foreign Application Priority Data

Aug. 31, 2020 (JP) .................... 2020-145306

(51) Int. Cl.
*H04W 4/90* (2018.01)
*H04W 4/44* (2018.01)
*H04W 12/06* (2021.01)

(52) U.S. Cl.
CPC .............. *H04W 4/90* (2018.02); *H04W 4/44* (2018.02); *H04W 12/06* (2013.01)

(58) Field of Classification Search
CPC ......... H04W 4/90; H04W 4/44; H04W 12/06; G08G 1/202; H04M 3/5116
See application file for complete search history.

(56) References Cited

U.S. PATENT DOCUMENTS

| | | | |
|---|---|---|---|
| 9,767,677 B1* | 9/2017 | Paulin ................. | G08B 25/005 |
| 10,853,882 B1* | 12/2020 | Leise .................. | G06T 5/50 |
| 2012/0252431 A1* | 10/2012 | Gee ................... | H04W 4/90 |
| | | | 455/422.1 |
| 2013/0099892 A1* | 4/2013 | Tucker ................ | H04L 9/08 |
| | | | 340/5.61 |
| 2015/0164351 A1* | 6/2015 | He .................... | A61B 5/0285 |
| | | | 702/19 |
| 2022/0067410 A1* | 3/2022 | Raz .................... | H04N 13/254 |

FOREIGN PATENT DOCUMENTS

JP    2001-216588 A    8/2001

* cited by examiner

*Primary Examiner* — Minjung Kim
(74) *Attorney, Agent, or Firm* — McDermott Will & Emery LLP

(57) ABSTRACT

A vehicle with an automatic report function includes a first communication apparatus and a controller. The first communication apparatus is configured to transmit emergency information at an emergency of the vehicle to a server apparatus for requesting emergency dispatch. The controller is configured to cause the first communication apparatus to automatically transmit the emergency information at the emergency of the vehicle to the server apparatus. At the transmission of the emergency information, the controller causes the first communication apparatus to transmit, to the server apparatus, contact information of a mobile terminal of an occupant of the vehicle.

6 Claims, 5 Drawing Sheets

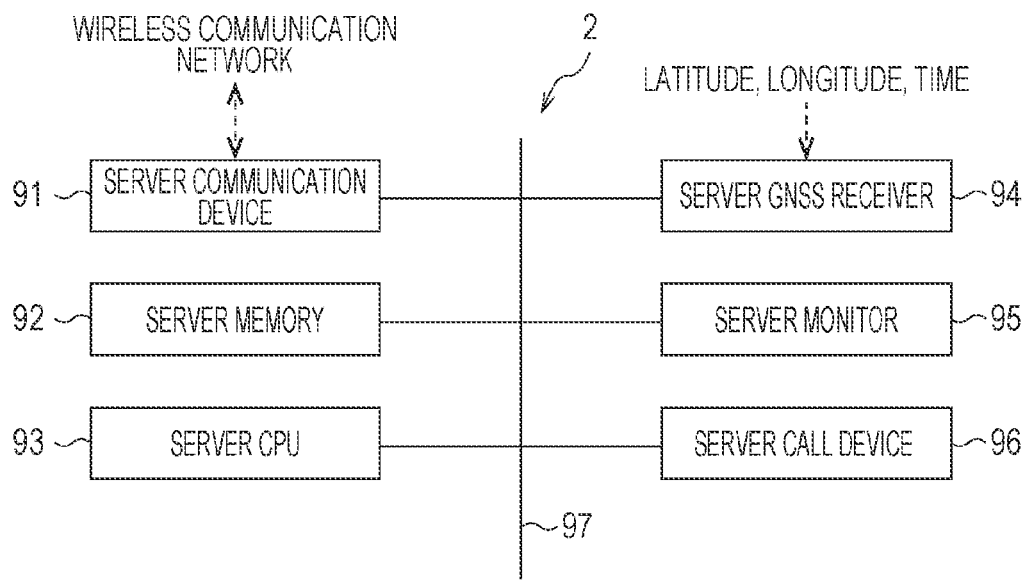
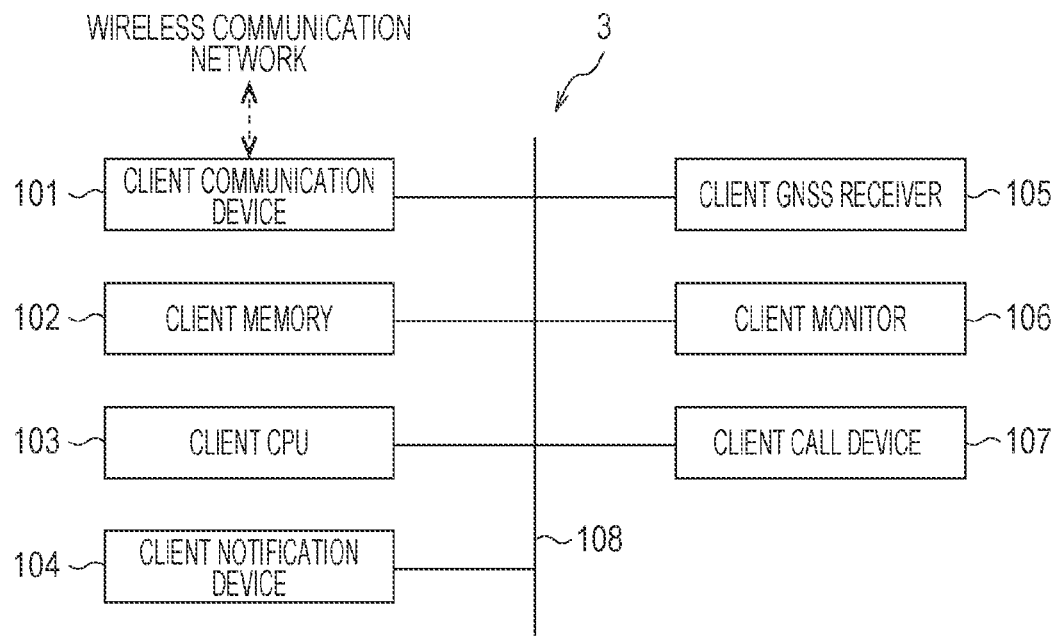

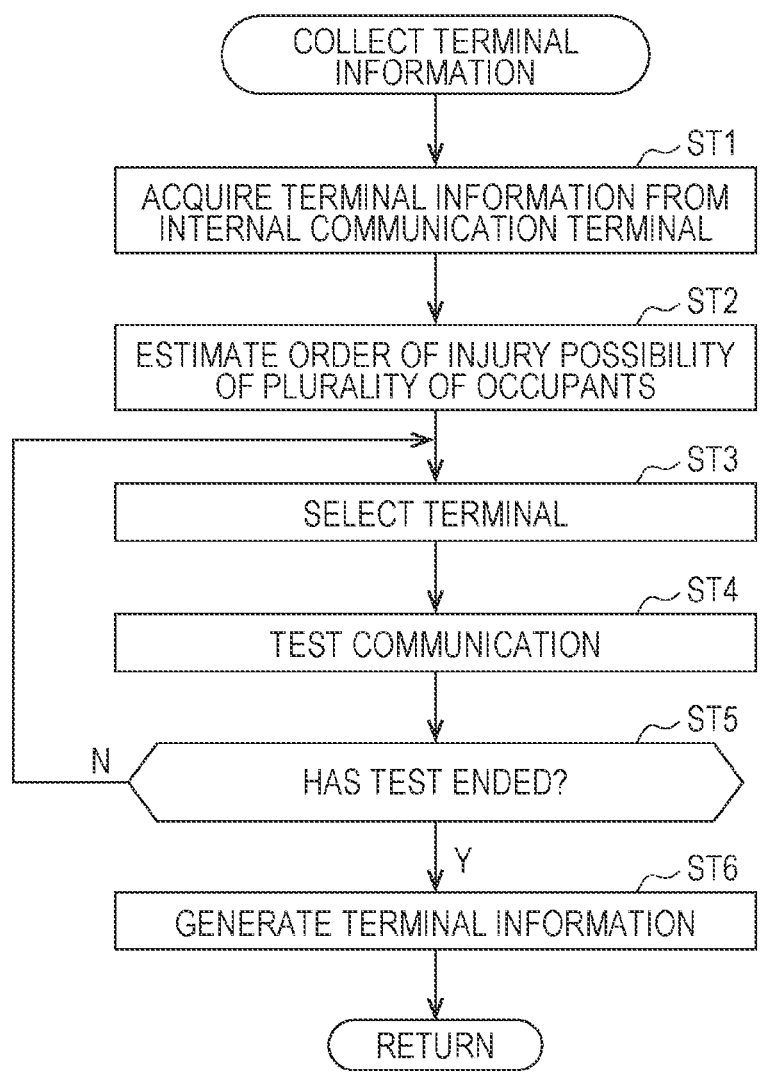

VEHICLE WITH AUTOMATIC REPORT FUNCTION

CROSS-REFERENCE TO RELATED APPLICATIONS

The present application claims priority from Japanese Patent Application No. 2020-145306 filed on Aug. 31, 2020, the entire contents of which are hereby incorporated by reference.

BACKGROUND

The disclosure relates to a vehicle with an automatic report function.

If an accident occurs for a vehicle such as an automobile, the accident that has occurred may be reported urgently. For example, an automatic emergency report system is put into practical use for automobiles. With the automatic emergency report system, an automobile involved in an accident transmits accident information to a server apparatus at a call center by using an automatic report apparatus provided in the automobile. The accident information includes an operation state and the location of an occupant protection apparatus at the time of the accident and the input direction and strength of impact in the accident (Japanese Unexamined Patent Application Publication No. 2001-216588). At the call center, the server apparatus receives the accident information, and the accident information is checked to request the dispatch of a rescue team with an air ambulance or ambulance. This can shorten a lead time before the air ambulance or ambulance is dispatched. Thus, the possibility of saving victims of the accident is increased.

SUMMARY

An aspect of the disclosure provides a vehicle with an automatic report function. The vehicle includes a first communication apparatus and a controller. The first communication apparatus is configured to transmit emergency information at an emergency of the vehicle to a server apparatus for requesting emergency dispatch. The controller is configured to cause the first communication apparatus to automatically transmit the emergency information at the emergency of the vehicle to the server apparatus. At the transmission of the emergency information, the controller causes the first communication apparatus to transmit, to the server apparatus, contact information of a mobile terminal of an occupant of the vehicle.

An aspect of the disclosure provides a vehicle with an automatic report function. The vehicle includes a first communication apparatus and circuitry. The first communication apparatus is configured to transmit emergency information at an emergency of the vehicle to a server apparatus for requesting emergency dispatch. The circuitry is configured to cause the first communication apparatus to automatically transmit the emergency information at the emergency of the vehicle to the server apparatus, the emergency information comprising contact information of a mobile terminal of an occupant of the vehicle.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

FIG. 3 is an explanatory diagram of a server apparatus used at a call center in FIG. 1;

FIG. 4 is an explanatory diagram of a client terminal used by a rescue team in FIG. 1;

FIG. 6 is a sequence chart illustrating a flow of terminal information collecting processing in step ST14 in FIG. 5 in the automatic emergency report system according to a second embodiment of the disclosure.

DETAILED DESCRIPTION

Even if an automobile involved in an accident transmits accident information about the accident of the automobile, the information may be insufficient for rescue in some cases.

For example, an occupant's injury state due to the accident may be worse than usual.

In addition, in some cases, the rescue of the occupant for the accident of the automobile may be untypical. In a head-on collision, shift of the input position to the left or right changes protection of the automobile for the impact.

Thus, a call center that manages a server apparatus may call the automobile involved in the accident and directly check the state of the occupant of the automobile by telephone or the like. On the basis of the telephone call state or the presence or absence of an answer, a staff member at the call center can grasp the state of the occupant.

On the other hand, the occupant of the automobile involved in the accident may be in a situation to evacuate immediately from the automobile immediately after the accident. If vehicle fire may occur due to the accident, the occupant is to get out of the automobile immediately and evacuate to be away from the automobile. Even if a staff member at the call center calls the automobile involved in the accident, they are unable to correctly grasp the state of such an occupant who has evacuated.

It is desirable to provide an automatic emergency report system for vehicles, the automatic emergency report system being improved for occupant rescue.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1:
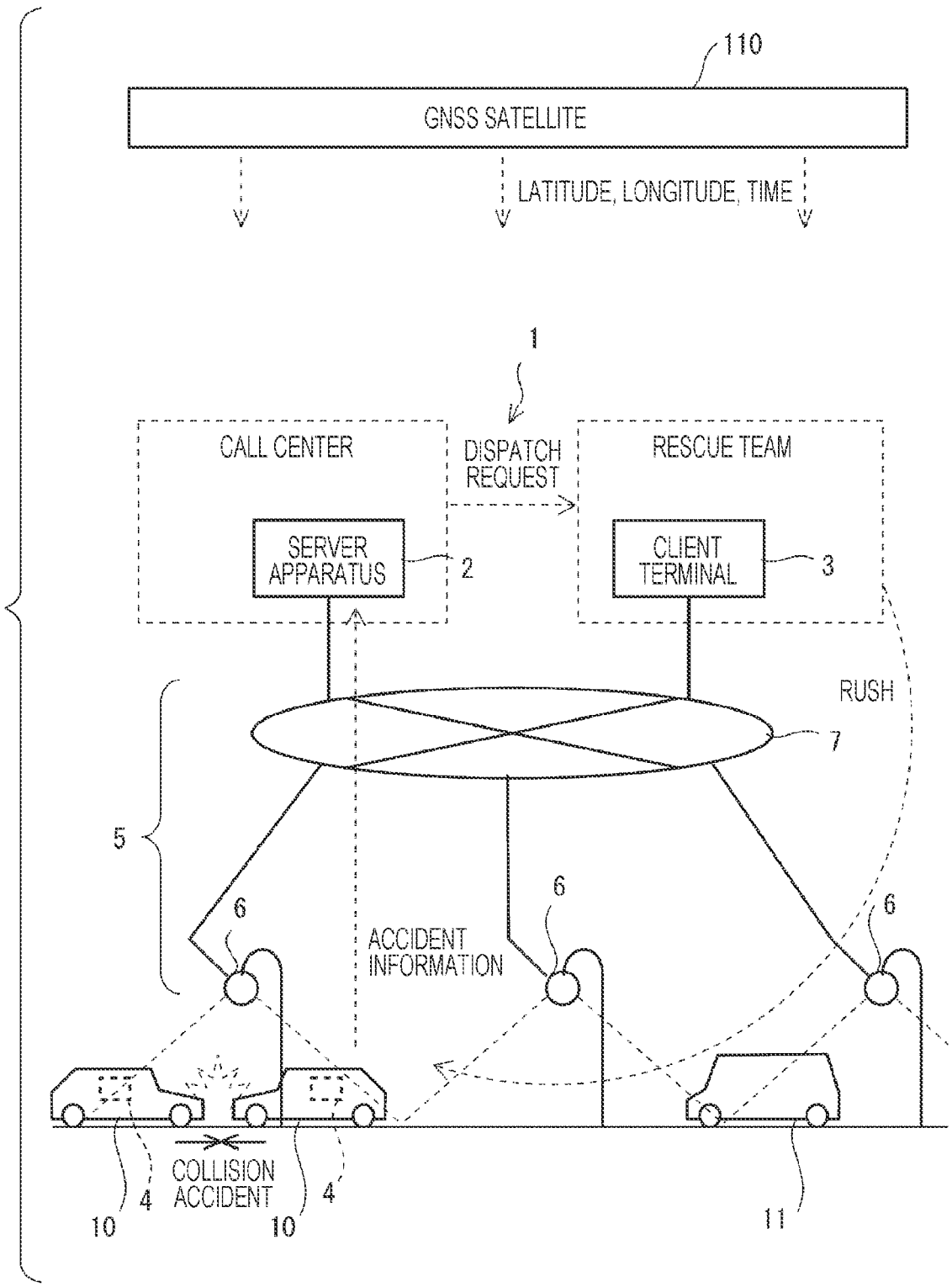
FIG. 1 is an explanatory diagram illustrating an example of an automatic emergency report system according to a first embodiment of the disclosure.

FIG. 1 is an explanatory diagram illustrating an example of an automatic emergency report system 1 according to a first embodiment of the disclosure.

The automatic emergency report system 1 in FIG. 1 includes a server apparatus 2, a client terminal 3, an automatic report apparatus 4, and a wireless communication network 5. The server apparatus 2 is used at a call center of an organization that manages accidents on roads caused by automobiles 10 and the like. The client terminal 3 is used by a rescue team such as firefighters. The automatic report apparatus 4 is provided in each of the plurality of automobiles 10. The wireless communication network 5 provides a communication line to the server apparatus 2, the client terminal 3, and the automatic report apparatus 4. The wireless communication network 5 includes a plurality of base stations 6 and a communication network 7. The base stations 6 are provided in an area in a dispersed manner along roads, for example, to communicate with a wireless terminal such as the automatic report apparatus 4. The communication network 7 connects the base stations 6. Each of the base stations 6 functions as an access point to which a plurality of wireless terminals in a communicable zone are connected. To the communication network 7 in FIG. 1, the server apparatus 2 at the call center and the client terminal 3 of the rescue team are connected.

An example of the above automatic emergency report system used when an accident occurs is an advanced automatic collision notification (AACN) system. In the AACN system, automatic accident information is immediately transmitted from an automobile 10 that is involved in the accident to the server apparatus 2 at the call center, and, in response to a dispatch request from the call center, a rescue team is dispatched with an ambulance 11 or an air ambulance. The call center can select the rescue team corresponding to the situation of the accident to make a dispatch request. The ambulance 11 or air ambulance can be dispatched for the accident site with the situation of the accident grasped. This can immediately provide victims of the accident with an appropriate lifesaving treatment in a short lead time. Thus, the possibility of saving victims of the accident is increased.

Note that FIG. 1 illustrates an example of the automatic emergency report system 1 used by a plurality of organizations in cooperation. However, the automatic emergency report system 1 may also be used by an organization alone that manages an area including roads on which the automobile 10 and the like can pass. Examples of the organization include the police, a fire department, a government office, a hospital, a medical institution, a security company, and a management company.

FIG. 1 further illustrates a global navigation satellite system (GNSS) satellite 110. Each of the apparatuses in FIG. 1 may receive radio waves including location information such as latitude and longitude and time information of a plurality of GNSS satellites 110 so as to obtain the location of the corresponding apparatus and the time. Furthermore, since the plurality of GNSS satellites 110 cooperate with each other, the plurality of apparatuses receiving radio waves therefrom may make the current time and the like match each other with high accuracy. The plurality of apparatuses can use a common time.

Even if the automobile 10 involved in the accident transmits accident information about the accident of the automobile 10 as described above, the information may be insufficient for rescue in some cases.

For example, an occupant's injury state due to the accident may be worse than the injury state that may be usually estimated from the state of the accident of the automobile 10.

In addition, in some cases, the rescue of the occupant for the accident of the automobile 10 may be untypical. In a head-on collision, a slight shift of the input position from the center of the automobile 10 to the left or right changes a response of the automobile 10 to the impact or the degree of protection of the occupant.

Thus, a call center that manages the server apparatus 2 may call the occupant of the automobile 10 involved in the accident and directly check the state of the occupant of the automobile 10 by telephone or the like. On the basis of the telephone call state or the presence or absence of an answer, a staff member at the call center can grasp the state of the occupant.

On the other hand, the occupant of the automobile 10 involved in the accident may be in a situation to evacuate immediately from the automobile 10 immediately after the accident. If fire may occur in the automobile 10 due to the accident, the occupant is to get out of the automobile 10 immediately and evacuate to be away from the automobile 10. At this time, if the call center calls a mobile terminal 121 before the occupant starts evacuating, the occupant can recognize the presence of their mobile terminal 121 before being away from the automobile 10 or recognize the location of the mobile terminal 121 that has been lost due to the impact of the accident, and the occupant can carry the mobile terminal 121 to the outside of the automobile 10 surely. Thus, even if the state of the occupant is not acquirable via the automobile 10, the call center can continue to acquire the information via the mobile terminal 121.

With this embodiment, it is possible to more correctly grasp the degree of the injury of the occupant due to the accident on the basis of their answer to the call from the call center, to prevent the occupant from leaving the mobile terminal 121 in the automobile 10 when evacuating from the automobile 10, and to allow the call center to acquire information even after the occupant has evacuated from the automobile 10.

Figure 2:
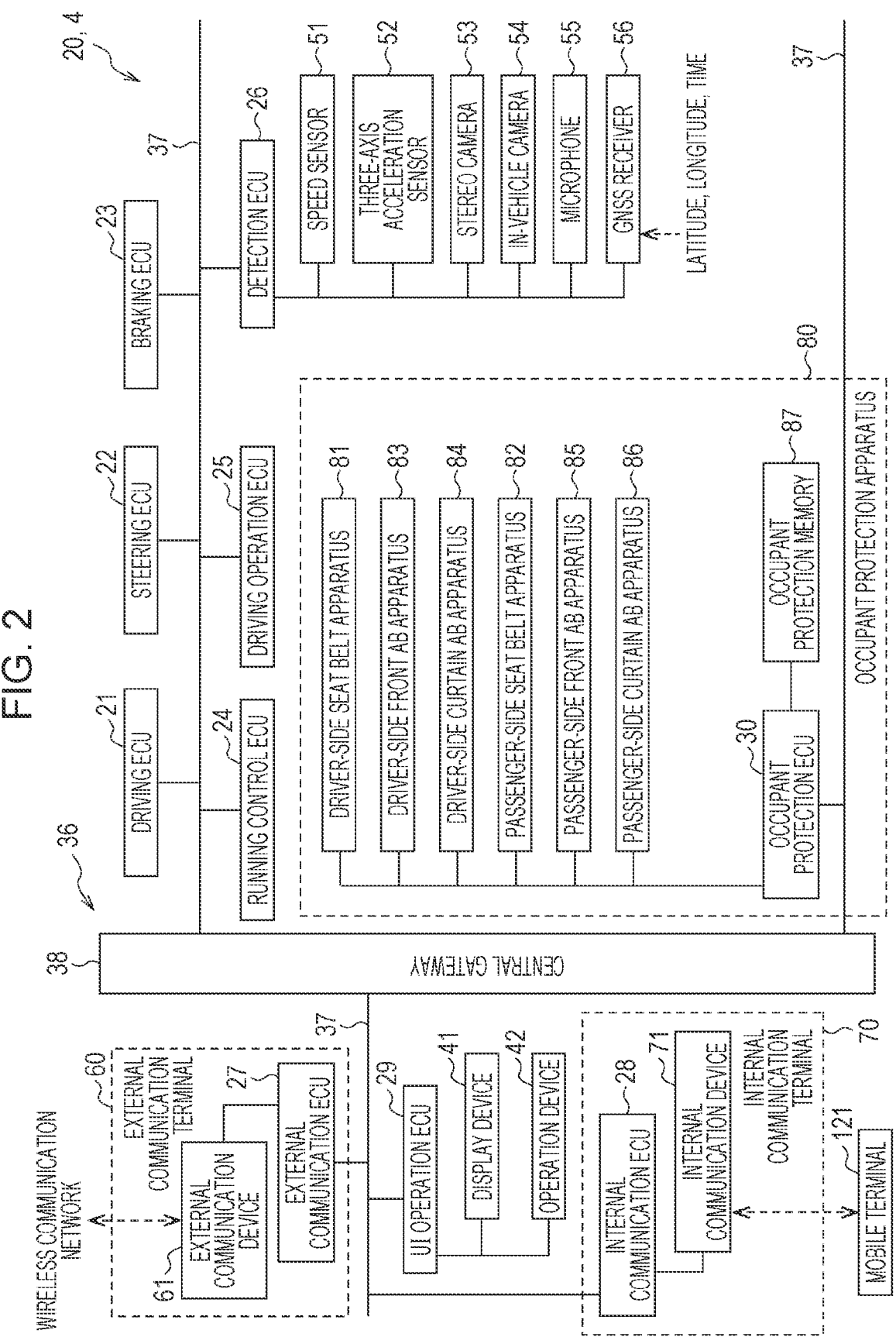
FIG. 2 is an explanatory diagram of a control system of an automobile for which an emergency, such as an accident, may occur in FIG. 1, the control system being capable of serving as an automatic report apparatus.

FIG. 2 is an explanatory diagram of a control system 20 of the automobile 10 for which an emergency, such as an accident, may occur in FIG. 1. The control system 20 is capable of serving as the automatic report apparatus 4.

In the control system 20 of the automobile 10 in FIG. 2, as a representative of each of a plurality of control apparatuses, a control electronic control unit (ECU) that is incorporated in a corresponding one of the control apparatuses is illustrated. In addition to the control ECU, the control apparatus may include, for example, a memory for storing a control program and data, an input/output port coupled to a control object or an apparatus that detects the state thereof, a timer for measuring time, and an internal bus to which the control ECU, the memory, the input/output port, and the timer are coupled.

In one example, the control ECUs illustrated in FIG. 2 are a driving ECU 21, a steering ECU 22, a braking ECU 23, a running control ECU 24, a driving operation ECU 25, a detection ECU 26, an external communication ECU 27, an internal communication ECU 28, a user interface (UI) operation ECU 29, and an occupant protection ECU 30. The control system 20 of the automobile 10 may include another control ECU (not illustrated).

The plurality of control ECUs are connected to a vehicle network 36 such as a controller area network (CAN) or a local interconnect network (LIN) employed in the automobile 10. The vehicle network 36 may include a plurality of bus cables 37 and a central gateway (CGW) 38. The plurality of control ECUs may be coupled via the bus cables 37, and the central gateway 38 serves as a relay apparatus to which the plurality of bus cables 37 are coupled. IDs as identification information different from each other are allocated to the plurality of control ECUs. Basically, a control ECU periodically outputs data to another control ECU. The data includes the ID of a control ECU from which the data is output and the ID of a control ECU to which the data is output. The other control ECU monitors the bus cables 37, and, if, for example, data includes the ID of the other control ECU as the ID of a control ECU to which the data is output, the other control ECU acquires the data and performs processing based on the data. The central gateway 38 monitors each of the plurality of bus cables 37 that are coupled thereto. Upon detection of data that is output from a control ECU coupled to a certain bus cable 37 to a control ECU coupled to another bus cable 37, the central gateway 38 outputs the data to the other bus cable 37. With such relay processing performed by the central gateway 38, data may be input and output between the plurality of control ECUs even if the control ECUs are coupled to different bus cables 37.

To the UI operation ECU 29, for example, a display device and an operation device 42 are coupled as user interface devices for an occupant of the automobile 10. The display device 41 may be, for example, a liquid crystal device or a video projection device. The operation device 42 may be, for example, a touch panel, a keyboard, or a contactless operation detection device. The display device 41 and the operation device 42 may be installed, for example, on an inner surface of a cabin where occupants board. The UI operation ECU 29 acquires data from the vehicle network 36 and causes the display device 41 to display the data. The UI operation ECU 29 outputs an operation input on the operation device 42 to the vehicle network 36. The UI operation ECU 29 may further perform processing based on the operation input and may add the processing results to the data. For example, the UI operation ECU 29 may cause the display device 41 to display a navigation screen for setting a destination or the like, may search for a route to the destination selected by an operation input, and may add the route data to the data. The route data may include attribute information such as lanes of roads used for traveling from the current location to the destination.

To the driving operation ECU 25, for example, a steering wheel, a brake pedal, an accelerator pedal, a shift lever, and the like, which are not illustrated, are coupled as operation members for an occupant to control running of the automobile 10. In response to an operation on an operation member, the driving operation ECU 25 outputs data including the presence or absence of an operation, an operation amount, and the like to the vehicle network 36. The driving operation ECU 25 may further perform processing based on the operation on the operation member and may add the processing results to the data. For example, in a situation where another moving object or a fixed object is present in the traveling direction of the automobile 10, in response to an operation on the accelerator pedal, the driving operation ECU 25 may determine the abnormal operation and may add the determination results to the data.

To the detection ECU 26, as detection members for detecting the running state of the automobile 10, for example, a speed sensor 51, a three-axis acceleration sensor 52, a stereo camera 53, an in-vehicle camera 54, a microphone 55, a GNSS receiver 56, and the like are coupled. The speed sensor detects the speed of the automobile 10. The three-axis acceleration sensor 52 detects the acceleration of the automobile 10. The stereo camera 53 captures images of the surroundings of the automobile 10. The in-vehicle camera 54 captures images of occupants in the cabin. The microphone 55 converts sound inside and outside the vehicle into data. The GNSS receiver 56 locates the automobile 10. The GNSS receiver 56 receives radio waves from the plurality of GNSS satellites 110 and obtains the latitude and longitude that are the current location of the automobile 10 and the current time. The detection ECU 26 acquires detection information from the detection members and outputs data including the detection information to the vehicle network 36. The detection ECU 26 may further perform processing based on the detection information and may add the processing results to the data. For example, if the three-axis acceleration sensor 52 detects an acceleration exceeding a collision detection threshold, the detection ECU 26 may determine that a collision is detected and may add the collision detection results to the data. On the basis of an image captured by the stereo camera 53, the detection ECU 26 may extract an object that is present around the automobile 10, such as a pedestrian, another automobile 10, a street tree, a utility pole, or a guardrail. The detection ECU 26 may also determine the type or attribute of the object, and, in accordance with the position, size, and change of the object in the image, may estimate the relative direction, relative distance, and moving direction (if the object is moving) of the object. The detection ECU 26 may also add forecast information on a collision with another object including such estimation results to the data and may output the forecast information to the vehicle network 36.

To the external communication ECU 27, an external communication device 61 is coupled. The external communication device 61 wirelessly communicates with a base station 6 that is near the automobile 10 in the wireless communication network 5. Under control of the external communication ECU 27, data is transmitted to and received from the server apparatus 2 via the wireless communication network 5 by wireless communication between the external communication device 61 and the base station 6. The external communication ECU 27 and the external communication device 61 form an external communication terminal 60 provided for the automobile 10. The external communication terminal 60 is a transmission apparatus provided for the automobile 10 and is a type of a wireless terminal.

To the internal communication ECU 28, an internal communication device 71 is coupled. The internal communication device 71 performs short-range wireless communication with the mobile terminal 121 of an occupant in the automobile 10. Under control of the internal communication ECU 28, data is transmitted to and received from the mobile terminal 121 of the occupant of the automobile 10 by short-range wireless communication between the internal communication device 71 and the mobile terminal 121 of the occupant. The internal communication ECU 28 and the internal communication device 71 form an internal communication terminal 70 provided in the automobile 10 independently of the external communication terminal 60. Note that, basically, the mobile terminal 121 may be capable of wireless communication with a base station 6 that is nearby in the wireless communication network 5.

The communication between the internal communication terminal 70 and the mobile terminal 121 of the occupant of the automobile 10 may be wireless communication conforming to the standard IEEE 802.15.1, for example. By the standard IEEE 802.15.1, for example, at initial communication, authentication information of the mobile terminal 121 is registered in the internal communication terminal 70. The authentication information of the mobile terminal 121 may be stored in a memory (not illustrated) that is coupled to the internal communication ECU 28. In the future, the internal communication ECU 28 automatically authenticates the mobile terminal 121 by using the authentication information registered in advance and establishes communication between the internal communication terminal 70 and the mobile terminal 121. Thus, by the occupant boarding the automobile 10, the mobile terminal 121 of the occupant is automatically connected to the internal communication terminal 70 and becomes capable of communicating with the internal communication terminal 70.

The running control ECU 24 controls running of the automobile 10. For example, the running control ECU 24 acquires data from the external communication ECU 27, the detection ECU 26, the driving operation ECU 25, and the like via the vehicle network 36 and autonomously drives the automobile 10 or controls manual driving assistance for running of the automobile 10. The running control ECU 24 generates running control data for controlling running of the automobile 10 on the basis of the acquired data and outputs the running control data to the driving ECU 21, the steering ECU 22, and the braking ECU 23. The driving ECU 21, the steering ECU 22, and the braking ECU 23 control running of the automobile 10 on the basis of the input running control data.

To the occupant protection ECU 30, a plurality of seat belt apparatuses, a plurality of airbag apparatuses, and an occupant protection memory 87 are coupled. The seat belt apparatuses include, for example, a driver-side seat belt apparatus 81 for an occupant who drives the automobile 10 and a passenger-side seat belt apparatus 82 for an occupant who boards the same automobile 10. The airbag apparatuses include, for example, a driver-side front airbag apparatus 83 that is deployed in front of the occupant who drives the automobile 10, a driver-side curtain airbag apparatus 84 that is deployed beside the occupant who drives the automobile 10 and along the inner surface of the automobile 10, a passenger-side front airbag apparatus 85 that is deployed in front of the occupant who boards the same automobile 10, and a passenger-side curtain airbag apparatus 86 that is deployed beside the occupant who boards the same automobile 10 and along the inner surface of the automobile 10. The occupant protection ECU 30, the occupant protection memory 87, the driver-side seat belt apparatus 81, the passenger-side seat belt apparatus 82, the driver-side front airbag apparatus 83, the driver-side curtain airbag apparatus 84, the passenger-side front airbag apparatus 85, and the passenger-side curtain airbag apparatus 86 form an occupant protection apparatus 80.

On the basis of forecast information on a collision with another object or information on collision detection results from the detection ECU 26, the occupant protection ECU 30 activates or controls the seat belt apparatuses or the airbag apparatuses.

The occupant protection memory 87 is a computer-readable storage medium and has a program to be executed by the occupant protection ECU 30, set values, and the like stored therein. Information on details of control performed by the occupant protection ECU 30 may be stored in the occupant protection memory 87. The occupant protection ECU 30 reads the program from the occupant protection memory 87 and executes the program. Thus, the occupant protection ECU 30 may serve as an occupant protection controller of the automobile 10.

Upon detection of a collision, the occupant protection ECU 30 as the occupant protection controller of the automobile 10 performs occupant protection control. The occupant protection ECU 30 causes the external communication terminal 60 to automatically transmit emergency information on an accident of the automobile 10 to the server apparatus 2 for requesting emergency dispatch. Thus, the occupant protection ECU 30 can cause the external communication device 61 as a first communication apparatus to transmit the emergency information to the server apparatus 2 at an emergency of the automobile 10.

FIG. 3 is an explanatory diagram of the server apparatus 2 used at the call center in FIG. 1.

The server apparatus 2 in FIG. 3 includes a server communication device 91, a server memory 92, a server CPU 93, a server GNSS receiver 94, a server monitor 95, a server call device 96, and a server bus 97 to which the server communication device 91, the server memory 92, the server CPU 93, the server GNSS receiver 94, the server monitor 95, and the server call device 96 are coupled.

The server communication device 91 is coupled to the communication network 7 of the wireless communication network 5. The server communication device 91 transmits and receives data to and from other apparatuses, for example, the external communication terminal 60 as a wireless terminal of the automobile 10 and the client terminal 3, via the wireless communication network 5.

The server GNSS receiver 94 receives radio waves from the GNSS satellites 110 to obtain the current time. The server apparatus 2 may include a server timer (not illustrated) to be calibrated by using the current time obtained by the server GNSS receiver 94.

The server monitor 95 displays information of the server apparatus 2. For example, the server monitor 95 displays emergency information received by the server apparatus 2 from the automobile 10 involved in an accident or the like.

The server call device 96 is used by a staff member at the call center to talk with a user of the mobile terminal 121 connected by using the server communication device 91.

The server memory 92 is a computer-readable storage medium and has a program to be executed by the server CPU 93, set values, and the like stored therein. Information on details of control performed by the server CPU 93 may be stored in the server memory 92. The server CPU 93 reads the program from the server memory 92 and executes the program. Thus, a server controller is implemented in the server apparatus 2. The server CPU 93 as the server controller manages an overall operation of the server apparatus 2.

FIG. 4 is an explanatory diagram of the client terminal 3 used by the rescue team in FIG. 1.

The client terminal 3 in FIG. 4 includes a client communication device 101, a client memory 102, a client CPU 103, a client notification device 104, a client GNSS receiver 105, a client monitor 106, a client call device 107, and a client bus 108 to which the client communication device 101, the client memory 102, the client CPU 103, the client notification device 104, the client GNSS receiver 105, the client monitor 106, and the client call device 107 are coupled.

The client communication device 101 is coupled to the communication network 7 of the wireless communication network 5. The client communication device 101 transmits and receives data to and from other apparatuses, for example, the external communication device 61 as a wireless terminal of the automobile 10 and the server apparatus 2, via the wireless communication network 5.

The client GNSS receiver 105 receives radio waves from the GNSS satellites 110 to obtain the current time. The client terminal 3 may include a server timer (not illustrated) to be calibrated by using the current time obtained by the client GNSS receiver 105.

The client monitor 106 displays information of the client terminal 3. For example, the client monitor 106 displays a dispatch request or the like received from the server apparatus 2.

The client notification device 104 outputs a dispatch request sound to members of the rescue team.

The client call device 107 is used by a member of the rescue team to talk with a user of the mobile terminal 121 connected by using the client communication device 101.

The client memory 102 is a computer-readable storage medium and has a program to be executed by the client CPU 103, set values, and the like stored therein. Information on details of control performed by the client CPU 103 may be stored in the client memory 102. The client CPU 103 reads the program from the client memory 102 and executes the program. Thus, a client controller is implemented in the client terminal 3. The client CPU 103 as the client controller manages an overall operation of the client terminal 3.

Figure 5:
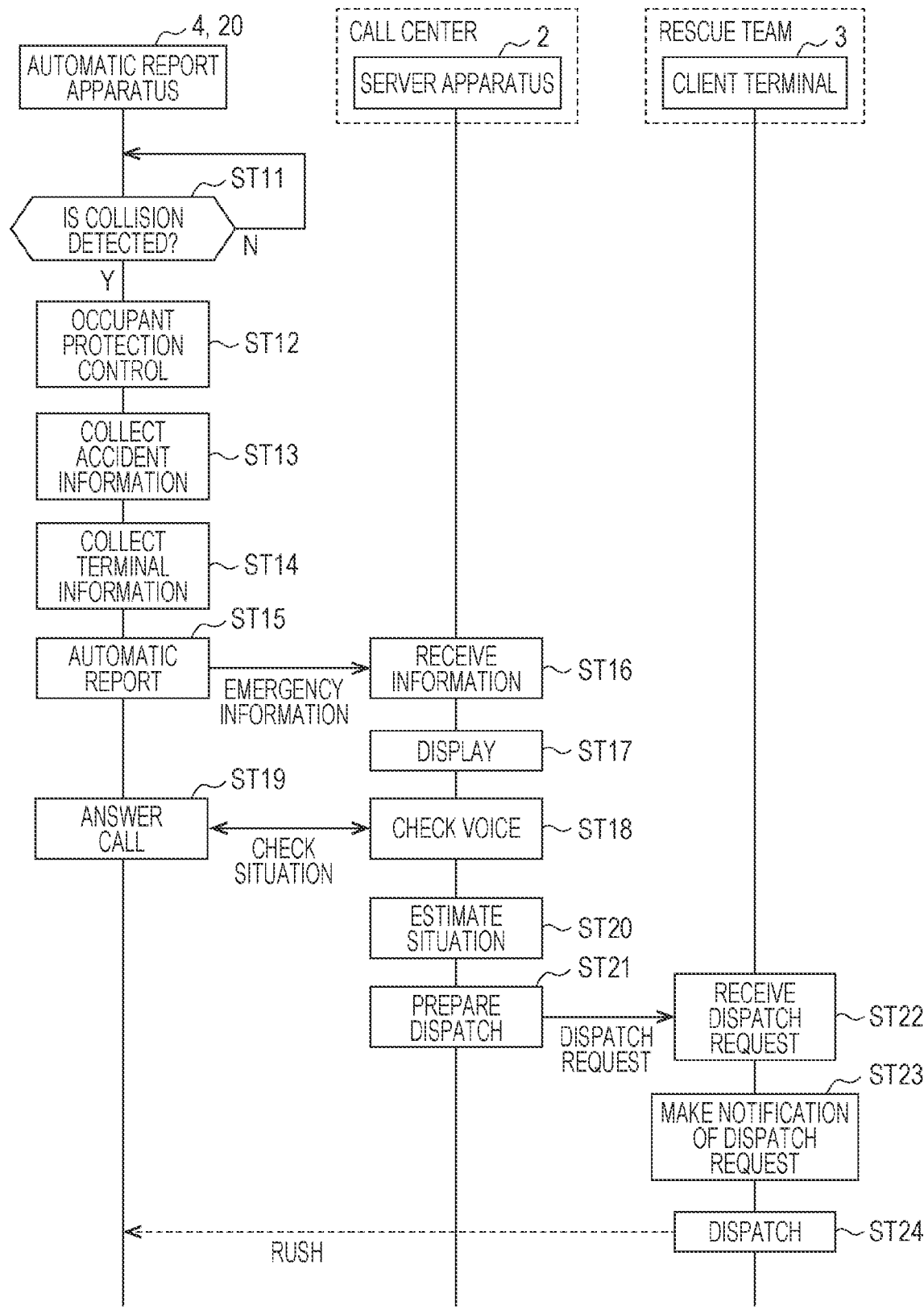
FIG. 5 is a sequence chart illustrating a process flow of the automatic emergency report system in FIG. 1 in a case where the automobile involved in an accident directly transmits an automatic emergency report to the server apparatus.

FIG. 5 is a sequence chart illustrating a process flow of the automatic emergency report system 1 in FIG. 1 in a case where the automobile 10 involved in an accident directly transmits an automatic emergency report to the server apparatus 2.

FIG. 5 illustrates the control system 20 as the automatic report apparatus 4 of the automobile 10, the server apparatus 2 at the call center, and the client terminal 3 of the rescue team. Time flows from top to bottom.

In step ST11, the detection ECU 26 of the automobile 10 detects a collision of the automobile 10. For example, the detection ECU 26 detects a collision if the acceleration detected by the three-axis acceleration sensor 52 is greater than a predetermined threshold. If no collision is detected, the detection ECU 26 repeats the processing in step ST11. Upon the collision being detected, the detection ECU 26 transmits collision detection information to the occupant protection ECU and advances the processing to step ST12. Note that the detection ECU 26 may end the processing if no collision is detected after a lapse of a certain period of time from the start of the processing.

Note that the detection ECU 26 may forecast that a collision is unavoidable before detecting the collision. In addition, on the basis of the forecast that the collision is unavoidable, the occupant protection ECU 30 may perform preliminary control for occupant protection before detecting the collision. As the preliminary control, the occupant protection ECU 30 may, for example, wind up surplus of a seat belt of a seat belt apparatus to set a pre-tension state or perform other processing. For example, the occupant protection ECU 30 may pre-deploy an airbag apparatus.

In step ST12, the occupant protection ECU 30 of the automobile 10 that has detected the collision performs occupant protection control on the basis of the collision detection information. The occupant protection ECU 30 activates a seat belt apparatus and an airbag apparatus that are selected. Thus, a seated occupant is constrained in the seat, or, even if the occupant falls from the seat, the airbag can absorb the impact.

In this embodiment, the occupant protection ECU 30 performs the occupant protection control after the collision has been detected in step ST11. However, the occupant protection ECU 30 may alternatively perform the occupant protection control on the basis of the collision forecast before the collision detection.

In step ST13, the occupant protection ECU 30 of the automobile 10 collects accident information. The accident information may basically be information collected by the AACN system described above. The AACN system collects the accident information such as an operation state and the location of the occupant protection apparatus 80 at the time of the accident and the input direction and strength of the impact in the accident.

In step ST14, the internal communication ECU 28 of the automobile 10 collects terminal information. For example, the internal communication ECU 28 collects contact information of the mobile terminal 121 that has been authenticated and registered in the internal communication terminal 70.

In step ST15, the external communication ECU 27 of the automobile 10 causes the external communication terminal 60 to transmit, as emergency information, to the server apparatus 2, the accident information collected by the occupant protection ECU 30 and the contact information of the mobile terminal 121 collected by the internal communication ECU 28. Thus, the automobile 10 automatically reports the emergency information about an emergency due to the accident.

Note that the accident information and the contact information of the mobile terminal 121 may also be collected by the external communication ECU 27.

In addition, the accident information may also be information about the state of the occupant after the accident, for example, a video of the inside of the automobile 10 after the accident.

In step ST16, the server communication device 91 of the server apparatus 2 at the call center receives the information of the automatic report from the automobile 10 involved in the accident. The information of the automatic report received by the server communication device 91 may be stored in the server memory 92.

In step ST17, the server CPU 93 of the server apparatus 2 at the call center causes the server monitor 95 to display the information of the automatic report received by the server communication device 91. On the basis of the accident information displayed on the server monitor 95, a staff member at the call center can check the situation of the accident of the automobile 10.

In step ST18, the server CPU 93 of the server apparatus 2 at the call center calls the occupant of the automobile 10 involved in the accident. For example, by using the server communication device 91, the server CPU 93 communicates with a communication terminal of the automobile 10 and establishes a call line. In step ST19, the occupant protection ECU 30 of the automobile 10 answers a voice call. The occupant protection ECU 30 causes a speaker (not illustrated) to output voice from the server apparatus 2 and causes the microphone 55 to collect voice inside the automobile 10 and to transmit the voice to the server apparatus 2. Thus, the staff member at the call center can talk with the occupant left in the automobile 10 after the accident by voice and grasp a state such as the degree of the injury of the occupant.

If the communication terminal of the automobile 10 does not answer, the server CPU 93 calls the mobile terminal 121 on the basis of a contact list received from the automobile 10 involved in the accident. The mobile terminal 121 answers the voice call. Thus, the staff member at the call center can talk with the occupant left in the automobile 10 after the accident by voice and grasp a state such as the degree of the injury of the occupant.

In addition, in a case where the occupant is to evacuate from the automobile 10, if the call center makes a telephone call before the occupant starts evacuating, the occupant can recognize the presence of their mobile terminal 121 before being away from the automobile 10 or recognize the location of the mobile terminal 121 that has been lost due to the impact of the accident, and the occupant can carry the mobile terminal 121 to the outside of the automobile 10 surely. Thus, even if the state of the occupant after the collision is not acquirable via the automobile 10 because the occupant has evacuated from the automobile 10, the call center can continue to acquire the information via the mobile terminal 121.

If no answer is obtained in either case, the server CPU 93 ends the processing. The staff member at the call center may input the check results to the server apparatus 2.

Through such processing, the server CPU 93 as a server controller can acquire the state such as the degree of the injury of the occupant who is the user of the mobile terminal 121 by using the contact information of the mobile terminal 121 of the occupant of the automobile 10, the contact information being included in the emergency information.

In step ST20, the server CPU 93 of the server apparatus 2 at the call center estimates the situation. The server CPU 93 may estimate the situation on the basis of the information of the automatic report received by the server communication device 91 and the information input by the staff member at the call center. The server CPU 93 may collate with previous accident information and may estimate the situation by artificial intelligence processing. The staff member at the call center may alternatively estimate the situation by comprehensively considering the situation and may input the estimation results to the server apparatus 2.

In step ST21, the server CPU 93 of the server apparatus 2 at the call center prepares the dispatch. The server CPU 93 transmits a dispatch request to the client terminal 3 of the rescue team by using the server communication device 91. The server CPU 93 may transmit the dispatch request in response to an operation performed by the staff member at the call center.

In step ST22, the client communication device 101 of the client terminal 3 of the rescue team receives the dispatch request from the server apparatus 2. The dispatch request received by the client communication device 101 may be stored in the client memory 102.

In step ST23, the client CPU 103 of the client terminal 3 of the rescue team makes a notification of the dispatch request. Upon the client communication device 101 receiving the dispatch request, the client CPU 103 causes the client notification device 104 to output a dispatch request sound. The client CPU 103 may also cause the client monitor 106 to display a dispatch request screen. The dispatch request screen may display the information of the automatic report and the information input by the staff member at the call center.

In step ST24, members of the rescue team are dispatched. The members of the rescue team can grasp that the dispatch request is made for the team from the dispatch request sound and the dispatch request screen and can be dispatched urgently with the ambulance 11 or air ambulance.

As described above, in this embodiment, the emergency information is automatically transmitted from the external communication device 61 as a first communication apparatus to the server apparatus 2 at an emergency of the automobile 10. The emergency information includes, together with the accident information about the accident of the automobile 10, the contact information of the mobile terminal 121 of the occupant of the automobile 10, such as a telephone number or a short message service (SMS) account. Thus, the staff member or the like at the call center can contact, not the automobile 10, but the occupant of the automobile 10 involved in the accident, on the basis of the contact information of the mobile terminal 121 of the occupant, the contact information being included in the emergency information received by the server apparatus 2. The staff member or the like at the call center can estimate the safety, injury state, or the like of the occupant who has evacuated from the automobile 10 to the outside. In addition, the staff member or the like at the call center can estimate that an occupant who does not answer the contact is likely to be injured seriously.

Second Embodiment

Next, the automatic emergency report system 1 according to a second embodiment of the disclosure will be described. In this embodiment, components that are substantially the same as those of the above-described embodiment are denoted by the same reference numerals as those of the above-described embodiment, and description thereof is omitted. In the following description, differences from the above-described embodiment will mainly be described.

FIG. 6 is a sequence chart illustrating a flow of terminal information collecting processing in step ST14 in FIG. 5 in the automatic emergency report system 1 according to the second embodiment of the disclosure.

The automobile 10 performs the processing in FIG. 6 in order to transmit emergency information at the time of an accident.

In step ST1, the internal communication ECU 28 of the internal communication terminal 70 acquires information of mobile terminals 121 from the internal communication device 71. In the internal communication terminal 70, typically, at least authentication information of the mobile terminals 121 of occupants who usually board the automobile 10 is registered. These occupants are likely to be in the automobile 10 at the time the above emergency occurs. Basically, the internal communication ECU 28 may acquire the information of such authenticated mobile terminals 121 from the internal communication terminal 70.

Herein, on the basis of an image captured by the in-vehicle camera 54, the internal communication ECU 28 may identify the plurality of occupants who are in the automobile 10 before a collision, which is, during running, or after a collision and may acquire the information of the mobile terminals 121 of the identified occupants alone. Note that information of as many mobile terminals 121 as possible, which are not authenticated at the time but are recognized on the basis of detection of radio waves, may be included by the internal communication terminal 70. Thus, the information of the mobile terminals 121 acquired by the internal communication ECU 28 appropriately corresponds to the occupants who are in the automobile 10 at the time of the collision. It is unlikely that the information of the mobile terminals 121 acquired by the internal communication ECU 28 additionally include information of mobile terminals 121 of persons who are not in the automobile 10.

In step ST2, on the basis of an image captured by the in-vehicle camera 54, the detection ECU 26 determines seated positions of the plurality of occupants who are in the automobile 10 before the collision, which is during running, or after the collision and estimates the order of the injury possibility of the plurality of occupants. In a case of the accident of the automobile 10, not all the occupants who are in the automobile 10 are injured in the same manner. Thus, for example, the detection ECU 26 may estimate the degree of the injury of the plurality of occupants on the basis of the order of the distance from the input part of the collision to the seated position of each occupant. In this case, an occupant whose seated position is the closest to the input part of the collision is estimated to be more likely to be injured than other occupants whose seated positions are farther. Alternatively, for example, the detection ECU 26 may estimate the degree of the injury of the plurality of occupants on the basis of the input part and strength of the collision in the automobile 10 and the operation state of the occupant protection apparatus 80. In this case, an occupant for whom the occupant protection apparatus 80 is estimated to have acted effectively in response to the input is estimated to be less likely to be injured than an occupant for whom the occupant protection apparatus 80 is estimated to have acted less effectively. On the basis of the collision situation, the activation situation of the protection apparatus, and the seated positions, the detection ECU 26 estimates the order of the injury possibility of the plurality of occupants.

In step ST3, for test communication with the mobile terminals 121, the occupant protection ECU 30 selects one of the plurality of mobile terminals 121 on the basis of information of the mobile terminals 121 acquired in step ST1. The occupant protection ECU 30 selects one of the mobile terminals 121 for which test communication is not performed. When initially performing the processing in step ST3, for example, the occupant protection ECU 30 may sort the information of the plurality of mobile terminals 121 acquired in step ST1 in the descending order of the injury possibility estimated in step ST2, and may first select the first mobile terminal 121 in a sorted terminal list.

In step ST4, the internal communication ECU 28 performs test communication with the selected mobile terminal 121 by using the internal communication terminal 70. For example, the internal communication terminal 70 calls the mobile terminal 121 to ring the ringtone. An occupant who is the user of the mobile terminal 121 can answer the call on the mobile terminal 121 if they are conscious. On the basis of whether a call is possible in the test communication or whether the test communication is answered, the internal communication ECU 28 can briefly determine the degree of the injury of the occupant who is the user of the mobile terminal 121. Thus, when transmitting the emergency information, the internal communication ECU 28 can check whether the mobile terminal 121 whose authentication information is registered in the internal communication terminal 70 as a second communication apparatus is capable of communicating with the internal communication terminal 70 after the emergency of the automobile 10 has occurred.

In step ST5, the internal communication ECU 28 determine whether test communication has ended for all the mobile terminals 121. If the test communication for all the mobile terminals 121 has not ended, the internal communication ECU 28 returns the processing to step ST3. The internal communication ECU 28 repeats the processing from step ST3 to step ST5 to newly select a mobile terminal 121 for which test communication is not performed, and performs the test communication. The internal communication ECU 28 repeats the processing from step ST3 to step ST5 until test communication for all the mobile terminals 121 ends to perform the test communication for all the mobile terminals 121. Upon ending of the test communication for all the mobile terminals 121, the internal communication ECU 28 advances the processing to step ST6.

In step ST6, on the basis of information collected through the above processing, the external communication ECU 27 generates terminal information to be transmitted to the server apparatus 2. For example, as the terminal information, the external communication ECU 27 generates list information of mobile terminals 121 of the occupants of the automobile 10 at the time of the accident. In the list information, information of the plurality of mobile terminals 121 may be sorted in the descending order of the injury possibility of the occupants. The information of each of the mobile terminals 121 may include, for example, contact information of the mobile terminal 121, such as a telephone number or an SMS account, information on details of the estimated injury possibility or the degree of the estimated injury, and information on whether the test communication is answered. Thus, the terminal information to be transmitted to the server apparatus 2 includes the contact information of the mobile terminal 121 for which the occupant is checked to be able to communicate.

As described above, in this embodiment, the emergency information is automatically transmitted from the external communication device 61 as a first communication apparatus to the server apparatus 2 at an emergency of the automobile 10. The emergency information includes, together with the accident information about the accident of the automobile 10, the contact information of the mobile terminal 121 of the occupant of the automobile 10, such as a telephone number or an SMS account. Thus, the staff member or the like at the call center can estimate the degree of the injury of the occupant of the automobile 10 before contacting, not the automobile 10, but the occupant of the automobile 10 involved in the accident, on the basis of the contact information of the mobile terminal 121 of the occupant, the contact information being included in the emergency information received by the server apparatus 2. The staff member or the like at the call center can estimate the safety, injury state, or the like of the occupant who has evacuated from the automobile 10 to the outside. In addition, the staff member or the like at the call center can estimate that an occupant who does not answer the contact is likely to be injured seriously.

Furthermore, in this embodiment, on the basis of whether a call is possible in the test communication or whether the test communication is answered, the internal communication ECU 28 can briefly determine, for example, the degree of the injury of the occupant who is the user of the mobile terminal 121, and thus, the staff member or the like at the call center can grasp the determination on the basis of the emergency information from the external communication terminal 60 before directly contacting the occupant by using the mobile terminal 121 of the occupant.

Furthermore, in a case where the occupant is to evacuate from the automobile 10 before the staff member or the like at the call center calls the mobile terminal 121 of the occupant, if the internal communication ECU 28 makes a test communication call before the occupant starts evacuating, the occupant can recognize the presence of their mobile terminal 121 before being away from the automobile 10 or recognize the location of the mobile terminal 121 that has been lost due to the impact of the accident, and the occupant can carry the mobile terminal 121 to the outside of the automobile 10 surely.

The above-described embodiments are examples of embodiments of the disclosure, and the disclosure is not limited thereto. Various modifications or changes may be made without departing from the gist of the disclosure.

In the embodiments described above, the plurality of ECUs are present in a separated manner in the automobile 10, but some or all of the ECUs may be integrated into one ECU.

In the embodiments described above, upon detection of an impact due to the accident, the occupant protection ECU 30 in the automatic report apparatus 4 of the automobile 10 collects accident information and terminal information and transmits both to the server apparatus 2.

Alternatively, for example, upon detection of an impact due to the accident, under control of the occupant protection ECU 30 in the automatic report apparatus 4 of the automobile 10, the accident information and the terminal information may be transmitted separately to the server apparatus 2. In FIG. 5, processing of automatically reporting the accident information may be added between step ST13 and step ST14. Even if the emergency information is transmitted in a plurality of times separately, the server apparatus 2 can associate the information on the basis of, for example, identification information that is unique to each automobile 10 included in the information. Furthermore, under control of the occupant protection ECU 30, the accident information can be transmitted as a first report of the accident as soon as the accident is detected, without a delay due to the time for collecting the terminal information. In addition, without considering the delay of the first report, the occupant protection ECU 30 can perform test communication for a plurality of mobile terminals. After a staff member at the call center in which the server apparatus 2 is provided has started to take action for the accident on the basis of the first report, the occupant protection ECU 30 enables transmission of information of the mobile terminals of a plurality of occupants without a delay.

In the disclosure, emergency information is automatically transmitted from a first communication apparatus to a server apparatus at an emergency of a vehicle. The emergency information includes, together with accident information about an accident of the vehicle, contact information of a mobile terminal of an occupant of the vehicle, such as a telephone number of the mobile terminal of an occupant. Thus, a staff member or the like at a call center can contact the occupant of the vehicle involved in the accident, on the basis of the contact information of the mobile terminal of the occupant, the contact information being included in the emergency information received by the server apparatus. The staff member or the like at the call center can directly check the safety, injury state, or the like of the occupant. In addition, the staff member or the like at the call center can estimate that an occupant who does not answer the contact is likely to be injured seriously.

In addition, in the disclosure, the staff member or the like at the call center contacts, not the first communication apparatus of the vehicle, but the mobile terminal of the occupant. Thus, even if the occupant has evacuated to the outside from the vehicle involved in the accident as emergency evacuation or the like, the staff member or the like at the call center can contact the occupant. In addition, on the basis of the contact information of the mobile terminal, a rescue team that has rushed to the site can also identify an occupant who does not answer. Furthermore, since the emergency information from the first communication apparatus includes the contact information of the mobile terminal of the occupant, for example, the vehicle in which the occupant has been present can be identified.

The control system 20 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control system 20 including the detection ECU 26, the external communication ECU 27, the internal communication ECU 28, and the occupant protection ECU 30. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle with an automatic report function, the vehicle comprising:
   a first communication apparatus configured to transmit emergency information at an emergency of the vehicle to a server apparatus for requesting emergency dispatch; and
   a controller configured to cause the first communication apparatus to automatically transmit the emergency information at the emergency of the vehicle to the server apparatus,
   wherein, at the transmission of the emergency information, the controller causes the first communication apparatus to transmit, to the server apparatus, contact information of a mobile terminal of an occupant of the vehicle,
   wherein, at the transmission of the emergency information, the controller causes the first communication apparatus to transmit, to the server apparatus, contact information pieces of respective mobile terminals of respective occupants of the vehicle, and
   wherein, in a case where the respective mobile terminals of the respective occupants in the vehicle are registered, the controller
      estimates an order of an injury possibility of the respective occupants, and
      sequentially communicates with the respective mobile terminals of the respective occupants in the determined order of the injury possibility.

2. The vehicle with an automatic report function according to claim 1, the vehicle further comprising:
   a second communication apparatus provided in the vehicle independently of the first communication apparatus, the second communication apparatus being configured to authenticate and communicate with a mobile terminal that is present in the vehicle,
   wherein the controller causes the first communication apparatus to transmit, to the server apparatus, contact information of the mobile terminal that is authenticated by the second communication apparatus.

3. The vehicle with an automatic report function according to claim 2, wherein the controller
checks whether the mobile terminal the authentication information of which is registered in the second communication apparatus is capable of communicating with the second communication apparatus after the emergency of the vehicle has occurred, and
causes the first communication apparatus to transmit, to the server apparatus, contact information of the mobile terminal checked to be capable of communicating with the second communication apparatus.

4. The vehicle with an automatic report function according to claim 2,
wherein the controller sequentially communicates with the respective mobile terminals of the respective occupants of the vehicle and causes the first communication apparatus to transmit, to the server apparatus, results of answers to the communication.

5. The vehicle with an automatic report function according to claim 3,
wherein the controller sequentially communicates with the respective mobile terminals of the respective occupants of the vehicle and causes the first communication apparatus to transmit, to the server apparatus, results of answers to the communication.

6. A vehicle with an automatic report function, the vehicle comprising:
a first communication apparatus configured to transmit emergency information at an emergency of the vehicle to a server apparatus for requesting emergency dispatch; and
circuitry configured to cause the first communication apparatus to automatically transmit the emergency information at the emergency of the vehicle to the server apparatus, the emergency information comprising contact information of a mobile terminal of an occupant of the vehicle,
wherein, at the transmission of the emergency information, the circuitry causes the first communication apparatus to transmit, to the server apparatus, contact information pieces of respective mobile terminals of respective occupants of the vehicle, and
wherein, in a case where the respective mobile terminals of the respective occupants in the vehicle are registered, the circuitry
estimates an order of an injury possibility of the respective occupants, and
sequentially communicates with the respective mobile terminals of the respective occupants in the determined order of the injury possibility.

* * * * *